United States Patent [19]
Ukyo et al.

[11] 3,872,108
[45] Mar. 18, 1975

[54] NOVEL CHROMONE DERIVATIVES AND THE PRODUCTION THEREOF

[75] Inventors: Akira Nohara Ukyo; Tomonobu Umetani; Yoshibumi Miyata; Yasushi Sanno, all of Osaka, Japan

[73] Assignee: Takeda Chemical Industries, Ltd., Osaka, Japan

[22] Filed: Nov. 1, 1972

[21] Appl. No.: 302,652

[30] Foreign Application Priority Data
Nov. 4, 1971 Japan.............................. 46-87880

[52] U.S. Cl............. 260/345.2, 424/283, 260/345.5
[51] Int. Cl............................................. C07d 7/52
[58] Field of Search...................... 260/345.2, 345.5

[56] References Cited
OTHER PUBLICATIONS
Boehm et al., Chemical Abstracts, Vol. 28, Cols. 1033 to 1034 (1934).

Checchi et al., Gazz. Chim. Ital. Vol. 95, pages 1502 to 1512 (1965)

Primary Examiner—John D. Randolph

[57] ABSTRACT

Chromones of the formula are disclosed

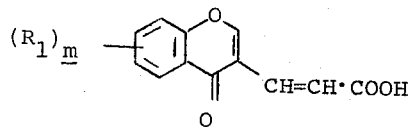

wherein m is 0, 1 or 2 and $R_1$ is halo, hydroxy, nitro, amino, lower alkylamino, lower alkyl, lower alkoxy, or lower acyloxy. These compounds are useful as antiallergy agents.

28 Claims, No Drawings

NOVEL CHROMONE DERIVATIVES AND THE PRODUCTION THEREOF

The present invention relates to novel chromone derivatives and their pharmaceutically acceptable salts, which have effective anti-allergic action, as well as to a process for the production of these compounds.

There have been employed many kinds of antihistaminic agents or bronchodilators for the treatment of bronchial asthma. However, the aforesaid antihistaminic agents show only antagonism towards histamine released or produced in a living body and thus they are not satisfactory in treating bronchial asthma. More specifically, they are not effective in the treatment of bronchial asthma which is caused by chemical mediators other than histamines. In respect to the aforesaid bronchodilators, they show only a direct dilating action on bronchial smooth muscle, and therefore they can be used only as a symptomatic drug.

On the other hand, it has recently been reported that an SRS-A(slow reacting substance of anaphylaxis) secreted from cells of a living body plays a very important part in the development of allergic phenomena including bronchial asthma and that inhibition of the secretion of SRS-A or the blocking action of SRS-A is very effective in the treatment of bronchial asthma.

Under these circumstances, the present inventors have made extensive studies to find out pharmaceuticals effective in inhibiting the secretion of SRS-A or blocking the action of SRS-A. As a result, they have succeeded in synthesizing novel chromone derivatives and establishing their pharmacological effects for the purposes intended, the aforesaid chromone derivatives being of the formula:

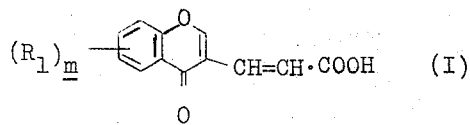

wherein $m$ is 0, 1 or 2 and each of $R_1$ is a halogen atom, hydroxy, nitro, amino, lower alkylamino, lower alkyl, lower alkoxy or a lower acyloxy group.

These compounds (I) strongly inhibit the secretion of SRS-A, histamine and other chemical mediators from cells of living body, and are characterized by low toxicity; furthermore they even exhibit the aforesaid activity upon oral administration.

Taking advantage of these characteristics, the present compounds (I) can be used as an effective medicine for preventing and/or treating allergic diseases, especially bronchial asthma, by means of oral administration.

Thus, the principal object of the present invention is to provide novel chromone derivatives (I) and their pharmaceutically acceptable salts which are useful as effective anti-allergic agents. Another object is to provide a method for producing these compounds.

Referring to the formula (I), the halogen atom may be any of chlorine, bromine, iodine and fluorine. The lower alkyl group may be suitably one having up to six carbon atoms, which may be any of the straight, branched chain or cyclic type. Typical examples of the lower alkyl group are methyl, ethyl, propyl, isopropyl, butyl, isobutyl, tert-butyl, pentyl, hexyl, cyclopentyl and cyclohexyl. The lower alkoxy group may be suitably one having up to four carbon atoms. The lower alkoxy group includes methoxy, ethoxy, propoxy and butoxy groups.

The lower acyloxy group may be suitably one having up to seven carbon atoms, and exemplified by formyloxy, acetyloxy, propionyloxy, butyryloxy and benzoyloxy.

The lower alkylamino group may be a mono-lower alkylamino or di-lower alkylamino, the lower alkyl group being suitably one having up to four carbon atoms which includes methylamino, ethylamino, propylamino, isopropylamino, butylamino, dimethylamino, diethylamino and dipropylamino groups.

In the formula (I), $R_1$ may occupy any position in the 5-,6-,7- and the 8-positions of the chromone ring when $m$ is 1, and the two substituents of $R_1$, which are the same or different, may occupy optionally two positions in the 5-, 6-, 7- and 8-positions when $m$ is 2.

The present compounds of the formula (I) may be produced by, for example, reacting a compound of the formula:

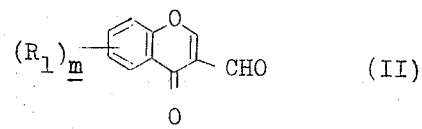

wherein $m$ and $R_1$ are as defined above with a compound of the formula:

wherein $R_2$ and $R_3$ may be the same or different, are cyano, carboxyl or a group derived from a carboxyl group.

Referring to the formula (III), the groups derived from the carboxyl group include esterfied carboxyl and carboxamide.

The esterified carboxyl group can be shown by the formula $X_1OOC-$ (wherein $X_1$ is a hydrocarbon residue). The hydrocarbon residue is suitably one having up to eight carbon atoms and may be any of a straight or branched chain, cyclic, saturated or unsaturated alkyl groups, such as methyl, ethyl, propyl, butyl, isopropyl, isobutyl, sec-butyl, tert-butyl and aralkyl groups such as benzyl and phenethyl.

The carboxamide group can be shown by the formula $X_2OC-$ (wherein $X_2$ is an amino or a substituted amino group). The substituted amino group represented by the symbol $X_2$ includes an alkylamino, dialkylamino, arylamino, aralkylamino, cyclic amino group, etc. Typical examples of such groups are methylamino, dimethylamino, diethylamino, 2-hydroxyethylamino, bis(2-hydroxyethyl)amino, benzylamino, phenylamino and morpholino.

In the preparation of the desired products (I), the starting compounds (III) are generally be employed in an amount of from about 1 to 2 mols relative to 1 mol of compounds (II).

The reaction between a compound of the formula (II) and a compound of the formula (III) may suitably be carried out in the presence of a solvent in which case, the reaction is conducted in the presence of a basic reagent or an acid anhydride. Solvents which may be used for this purpose include hydrocarbons (e.g. benzene or toluene), alcohols (e.g. methanol or ethanol) or a mixture of such solvents. Basic reagents which may be used include tertiary amines such as trimethylamine, triethylamine, N-methylpiperazine, N-methylmorpholine, N-methylpyrrolidine and basic heteroaromatic compounds such as pyridine, quinoline, imidazole, 2-methylimidazole, etc. Acid anhydrides which may be used include formic anhydride, acetic anhydride, propionic anhydride, succinic anhydride and benzoic anhydride. Among these basic reagent and acid anhydrides, the basic heteroaromatic compounds are most advantageous for practical purposes and can function as a reaction solvent as well.

While the reaction conditions including the temperature and time of the reaction depend upon such factors as the particular starting compound, the solvent and other factors, the reaction may be carried out at a temperature of from about 50° to about 160°C, and most advantageously from about 100° to about 150°C, for a period from several minutes to about 10 hours.

By the said reaction between the compound of the formula (II) and the compound of the formula (III), the desired products (I) are directly produced when both $R_2$ and $R_3$ of the compound (III) are carboxyl, i.e., the compound (III) is malonic acid.

Where $R_2$ is carboxyl and $R_3$ is cyano or a group derived from carboxyl such as an esterified carboxyl or carboxamide, a compound of the formula:

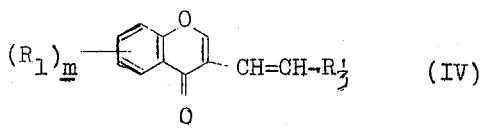

(IV)

wherein $m$ and $R_1$ are as defined above and $R_3'$ is cyano or the group derived from carboxyl, is formed by the said reaction.

When both $R_2$ and $R_3$ of the compound (III) are cyano or the group derived from a carboxyl group, a compound of the formula:

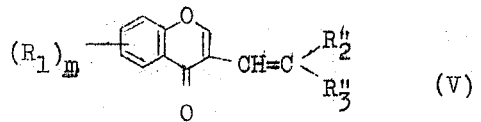

(V)

wherein $m$ and $R_1$ are as defined above and $R_2''$ and $R_3''$, which may be same or different, cyano or a group derived from carboxyl, is produced by the reaction between the compound (II) and the compound (III).

The thus formed compounds (IV) and (V) can be easily converted into the desired products (I) by hydrolyzing such starting compounds. The compound (IV) or (V) may be subjected to hydrolysis as it is, in the reaction mixture or after it is isolated from the reaction mixture by a conventional means such as extraction, chromatography or recrystallization.

In this hydrolysis step, one may employ any means in so far as it is capable of converting cyano or the group derived from the carboxyl to the free carboxylic acid except for those which will affect the benzopyran ring of the compounds (IV) or (V).

For example, the desired products of the formula (I) can be obtained by a reaction in which the compound (IV) or (V) is heated together with water and an inorganic acid such as sulfuric acid, hydrochloric acid or hydrobromic acid; or with water and an organic acid such as acetic acid; or with a mixture of inorganic and organic acids; or with water and an alkali metal hydroxide such as sodium hydroxide or potassium hydroxide. When $R_3'$ of the formula (IV) or $R_2''$ and/or $R_3''$ of the formula (V) are cyano groups, it is also possible that the compound (IV) or (V) is converted to the desired products (I) by treating the compound (IV) or (V) in the presence of a gaseous hydrogen halide such as hydrogen chloride or concentrated sulfuric acid and an alcohol such as methanol or ethanol to obtain the iminoester derivatives corresponding to the alcohol used and then, hydrolyzing the iminoester derivatives under the above-mentioned conditions.

When $R_1$ of the thus-obtained product (I) is a lower alkoxy or a lower acyloxy group, one may convert said groups to a hydroxy group by any means commonly used in the cleavage of the ether linkage (e.g., hydrolysis by heating with a concentrated mineral acid such as concentrated hydrobromic acid or concentrated hydroiodic acid with or without a suitable solvent such as acetic acid) or by any means which is routinely used in the cleavage reaction of ester bonds (e.g. hydrolysis with a hydrohalogenic acid such as hydrochloric acid or hydrobromic acid or an alkali metal hydroxide such as potassium hydroxide or sodium hydroxide).

Conversely, when $R_1$ is hydroxyl group, it may be alkylated with a common alkylating agent (e.g. dimethyl sulfate) to form a lower alkoxy group corresponding to said alkylating agent.

In the method of the present invention, the desired products (I) are predominantly produced in the trans-form, and even if a small amount of the cis-form compound is produced, it can easily be separated from the trans-form compound, for example, by the conventional isolation procedures such as recrystallization from an organic solvent (e.g. acetone, dimethylformamide, methanol, ethanol) or chromatography (e.g. silicagel column chromatography). Throughout the present specification, the trans-indication concerns the acrylic acid moiety of the compound (I).

From the viewpoint of pharmaceutical activity such as anti-allergic action, the trans-form of the products (I) is superior to the cis-form of such compounds.

The thus produced products (I) can be converted to their corresponding alkali metal salts or ammonium salts by a per se conventional manner using a compound which can supply an alkali metal ion or an ammonium ion. Typical examples of such compounds may be an alkali metal hydroxide (e.g. sodium hydroxide, potassium hydroxide, lithium hydroxide), alkali metal carbonate or alkali metal bicarbonate (e.g. sodium carbonate, sodium bicarbonate, potassium carbonate, potassium bicarbonate), alkali type strong cation exchange resins (e.g. sodium type of Amberlite IR-120; manufactured by Rohm & Haas Co., U.S.A.) or ammonium hydroxide.

The compounds (I) can also be converted to their organic amine salts by reaction with a suitable organic amine. The typical examples of the organic amine to be used suitably in the present invention may be mono-, di- or triethanolamine, diethylamine, triethylamine, dl-methylephedrine, 1-(3,5-dihydroxyphenyl)-L-isopropyl-aminoethanol, isoproterenol(3,4-dihydroxy-α-[(isopropyl-amino)methyl)benzyl alcohol), hetrazan(diethylcarbamazine), dextromethorphan(d-3-methoxy-N-methylmorphinan).

The thus produced products (I) or their salts may be easily separated from the reaction mixture and purified by a per se known means (e.g. extraction, distillation, recrystallization, chromatography).

The compounds (I) or their pharmaceutically acceptable salts have effective anti-allergic action and are useful as medicines in the treatment of allergic diseases such as hay fever, urticaria, allergic bronchial asthma, allergic rhinitis, dermatoses, and the like.

The following is an example of the tests in which the anti-allergic action of illustrative compounds of the present invention is demonstrated.

TEST FOR ANTI-ALLERGIC ACTION

The following process for evaluation of the effect of a compound (I) which inhibits the release of the mediators on anaphylaxis initiated by passively sensitizing with skin sensitizing antibodies is applied.

In this test, the inhibiting effect of a compound (I) against passive cutaneous anaphylaxis in rats is evaluated.

First, serum for a passive cutaneous anaphylaxis (PCA) reaction, whose PCA titer is 1:16, is prepared in accordance with Mota's method (Life Science 2, 917(1963)), and diluted four times with physiological saline solution to obtain a diluent A.

In the second step, rats (Spregue Dawley-JCL, male body weight: about 250g.) are passively sensitized with an intradermal injection of 0.05 ml. of the diluent A of four points of the rat's back skin, which has been clipped with electric clippers. Seventy-two hours after the sensitization, 1 ml. per rat of a solution containing 5 mg. of antigen (egg albumin) and 10 mg. of Evan's blue in physiological saline solution is injected intravenously in each rat to challenge skin anaphylaxis.

Thirty minutes after the injection, all rats are decapitated. Then, the back skin is flayed and a dimension of dye leaked inside the skin is measured. The dimension of the dye leaked observed in this experiment of control rats ranges from 250 to 300 mm.$^2$.

Each test compound is injected in 0.5 ml. volume of physiological saline solution per rat at various doses ranging from 0.6 mg./kg. to 5mg./kg. intravenously in three animals at each dose level just before challenging.

For the purpose of drug evaluation, the percentages of inhibition are calculated according to the following equation:

% Inhibition = (1 − Mean value of dimension of dye leaked of administered group/Mean value of dimension of dye leaked of control group × 100

A 50 percentage inhibition dose of each compound is calculated from the dose response curve graphically.

The results are shown in the following table 1:

| Compound | 50% Inhibition dose |
|---|---|
| Trans 3-(6-methyl-4-oxo-4H-1-benzopyran-3)acrylic acid | 1 – 2 mg./kg. |
| Trans 3-(6-ethyl-4-oxo-4H-1-benzopyran-3)acrylic acid | 1 – 2 mg./kg. |
| Trans 3-(6-methoxy-4-oxo-4H-1-benzopyran-3)acrylic acid | 1 – 2 mg./kg. |
| Trans 3-(6-n-butyl-4-oxo-4H-1-benzopyran-3)acrylic acid | 1 – 2 mg./kg. |

Moreover, the salts of the products (I) have generally high solubility in water, and therefore, it is practically convenient to use the salts, especially the organic amine salts of compounds (I) as medicines from the pharmaceutical and pharmacological point of view.

When the compounds (I) or their pharmaceutically acceptable salts are employed as anti-allergic agents for treating or/and preventing allergic diseases such as bronchial asthma, dermatoses and rhinitis, these compounds are administered in per se or in the form of a pharmaceutically acceptable composition in admixture with a suitable and conventional carriers or diluents.

The pharmaceutical composition may take the form of tablet, capsules granules, powders, solutions, injections, ointment, spray or inhalant, and may be administered orally and parenterally.

The therapeutically active usual daily doses of the compounds of the present invention is in the range of from about 1 to about 500 mgs. when administered orally or intravenously in an adult human.

The starting compounds (II) of the present invention may be produced, for example, by the processes illustrated by the following schema:

(VI)    (II)

wherein $m$ and $R_1$ are as defined above.

This reaction is conducted by reacting a compound of the formula (VI) with the Vilsmeier reagent which consists of equivalent mol(s) of dimethylformamide and an acid chloride such as phosphorus oxychloride, tetrachloropyrophosphate, thionyl chloride, phosgene, phosphorus pentachloride, etc., in the presence or absence of a suitable solvent. As the solvent, any solvent which does not hinder the reaction may be employed. Typical examples of such solvents are dimethylformamide, benzene, chloroform, or mixtures thereof.

The amount of dimethylformamide and acid chloride used is generally at least not less than about 2 mols, more suitably about 2 to 6 mols per mol of a compound of the formula (VI), respectively. The reaction can proceed at room temperature under atmospheric pressure, but, if necessary, may be carried out under heating up to about 150°C or cooling to about −20°C, or under elevated pressure. The reaction time varies with reaction conditions such as temperature, pressure or the type of acid chloride and solvent used, but it is generally about 1 to 24 hours.

For further explanation of the present invention, the following Reference and Examples are given, wherein the word "part(s)" is based on weight unless otherwise noted and the relationship between "part(s)" and "part(s) by volume" corresponds to that between "milligrams(s)" and "milliliter(s);" and throughout the specification the abbreviation "mg.," "g.," "kg.," "ml.," "°C," "N," "mm." and "Hz." refer to "milligram(s)," "gram(s)," "kilogram(s)," "milliliter(s)," "degree(s) centigrade," "Normal(s)," "millimeter(s)" and "Hertz," respectively.

REFERENCE

To a solution of 8,800 parts of 2-hydroxy-4-acetoxy-acetophenone in 35 parts by volume of dimethylformamide is gradually added at 10°C, dropwise, 17 parts by volume of phosphorus oxychloride. The temperature is gradually raised to room temperature and then the mixture is allowed to stand overnight. The reaction mixture is poured into ice water and the resulting crystals are collected by filtration and recrystallized from acetone to obtain 8,700 parts of 7-acetoxy-4-oxo-4H-1-benzopyran-3-carboxaldehyde as light yellowish needles melting at 157°–159°C. Elemental analysis Calculated for $C_{12}H_8O_5$: C, 62.07; H, 3.47
Found: C, 62.12; H, 3.43

The following compounds are prepared by a similar manner to the procedure set forth above.

| Starting compounds | Product | Crystal form / Solvent for recrystallization | Melting point (°C) |
|---|---|---|---|
| 2-Hydroxy-4,6-diacetoxy-acetophenone | 5,7-Diacetoxy-4-oxo-4H-1-benzo-pyran-3-carboxaldehyde | Colorless needles / Acetone | 162–163 (decomposition) |
| Dimethylformamide 2-Hydroxy-4,5-diacetoxy-acetophenone | 6,7-Diacetoxy-4-oxo-4H-1-benzo-pyran-3-carboxaldehyde | Colorless scales / Acetone | 140–141 |
| Dimethylformamide 2-Hydroxy-6-acetoxy-acetophenone | 5-Acetoxy-4-oxo-4H-1-benzopyran-3-carboxaldehyde | Colorless needles / Acetone | 174.5–176.5 |
| Dimethylformamide | | | |

Further, the above-obtained 7-acetoxy-4-oxo-4H-1-benzopyran-3-carboxaldehyde is hydrolyzed with concentrated hydrochloric acid and acetic acid to obtain 7-hydroxy-4-oxo-4H-1-benzophran-3-carboxaldehyde melting point 265.5°–268.5°C(decomposition), in the form of yellow prisms recrystallized from dimethylformamide - acetone - water) which is then methylated with dimethyl sulfate to obtain 7-methoxy-4-oxo-4H-1-benzo-pyran-3-carboxaldehyde (melting point 188°–189°C, in the form of pale yellowish needles recrystallized from acetone).

EXAMPLE 1

A solution of 3,480 parts of 4-oxo-4H-1-benzopyran-3-carboxaldehyde and 2,080 parts of dry malonic acid in 20 parts by volume of pyridine is heated in an oil bath, temperature of which is at 110°C, for 1 hour, after which time an additional 500 parts of dry malonic acid is added. The mixture is then heated at 110°C for an additional 30 minutes. The reaction mixture is concentrated and 20 parts by volume of acetone is added to the residual crystals which are then collected by filtration. The filtrate is concentrated and 20 parts by volume of acetone is added to the residue. Then, the solid product is collected by filtration and combined with the crystals previously obtained. These crystals are dissolved in 500 parts by volume of acetone while heating, decolorized with activated carbon and filtered while heating. The filtrate is allowed to stand in a refrigerator for 3 hours to obtain crystals. The procedure yields 3,200 parts of trans 3-(4-oxo-4H-1-benzopyran-3)acrylic acid as pale yellowish needles melting at 245°–246°C(decomposition with foaming). Elemental analysis Calculated for $C_{12}H_8O_4$: C, 66.67; H, 3.73
Found: C, 66.61; H, 3.56

Nuclear Magnetic Resonance spectrum ($d_6$-dimethylsulfoxide)d: 8.82(1H, singlet, $H_2'$) about 8.12(1H,quartet,$H_5'$), 7.9 - 7.4(3H, aromatic), 7.10(1H,doublet,J=16Hz.,$H_2$), 7.41(1H,doublet,J=16Hz.,$H_3$)

Mass spectrum m/e 216($M_+$), 171

EXAMPLES 2–16

The following compounds are synthesized by procedures similar to the procedure described in Example 1.

| Example No. | Starting compounds | Product | Crystal form / Solvent for recrystallization | Melting point (°C) |
|---|---|---|---|---|
| 2 | 7-Acetoxy-4-oxo-4H-1-benzopyran-3-carboxaldehyde + Malonic acid | Trans 3-(7-hydroxy-4-oxo-4H-1-benzopyran-3)acrylic acid | Light yellowish solid / Dimethylformamide, water | 288–290 (decomposition with foaming) |

-Continued

| Example No. | Starting compounds | Product | Crystal form / Solvent for recrystallization | Melting point (°C) |
|---|---|---|---|---|
| 3 | 5-Acetoxy-4-oxo-4H-1-benzopyran-3-carboxaldehyde + Malonic acid | Trans 3-(5-hydroxy-4-oxo-4H-1-benzopyran-3)acrylic acid | Light yellow needles / Dimethylformamide, water | 284–285 (decomposition with foaming) |
| 4 | 7-Hydroxy-4-oxo-4H-1-benzopyran-3-carboxaldehyde + Malonic acid | Trans 3-(7-hydroxy-4-oxo-4H-1-benzopyran-3)acrylic acid | Light yellow solid / Dimethylformamide, water | 288–290 (decomposition with foaming) |
| 5 | 7-Methoxy-4-oxo-4H-1-benzopyran-3-carboxaldehyde + Malonic acid | Trans 3-(7-methoxy-4-oxo-4H-1-benzopyran-3)acrylic acid | Light yellow needles / Dimethylformamide, acetone | 265–266 (decomposition with foaming) |
| 6 | 6,7-Diacetoxy-4-oxo-4H-1-benzopyran-3-carboxaldehyde + Malonic acid | Trans 3-(6,7-diacetoxy-4-oxo-4H-1-benzopyran-3)acrylic acid | Yellow solid / Dimethylformamide, water | 246–247 (decomposition with foaming) |
| 7 | 6,7-Dihydroxy-4-oxo-4H-1-benzopyran-3-carboxaldehyde + Malonic acid | Trans 3-(6,7-dihydroxy-4-oxo-4H-1-benzopyran-3)acrylic acid | Yellow needles / * | ** 300 or higher |
| 8 | 6,8-Dimethyl-4-oxo-4H-1-benzopyran-3-carboxaldehyde + Malonic acid | Trans 3-(6,8-dimethyl-4-oxo-4H-1-benzopyran-3)acrylic acid | Colorless fine needles / Dimethylformamide, ethanol | 286–288 (decomposition) |

—Continued

| Example No. | Starting compounds | Product | Crystal form / Solvent for recrystallization | Melting point (°C) |
|---|---|---|---|---|
| 9 | 6,8-Dibromo-4-oxo-4H-1-benzopyran-3-carboxaldehyde + Malonic acid | Trans 3-(6,8-dibromo-4-oxo-4H-1-benzopyran-3)acrylic acid | Pale yellow needles / Dimethylformamide | 275-277 (decomposition) |
| 10 | 6-N,N-dimethylamino-4-oxo-4H-1-benzopyran-3-carboxaldehyde + Malonic acid | Trans 3-(6-N,N-dimethylamino-4-oxo-4H-1-benzopyran-3)-acrylic acid | Yellowish fine needles / Methanol | 240.5-242.5 (decomposition) |
| 11 | 6-Ethyl-4-oxo-4H-1-benzopyran-3-carboxaldehyde + Malonic acid | Trans 3-(6-ethyl-4-oxo-4H-1-benzopyran-3)-acrylic acid | Yellow needles / Dimethylformamide, water | 224.5-226 (decomposition with foaming) |
| 12 | 6-Methoxy-4-oxo-4H-1-benzopyran-3-carboxaldehyde + Malonic acid | Trans 3-(6-methoxy-4-oxo-4H-1-benzopyran-3)acrylic acid | Colorless needles / Dimethylformamide, water | 251-253 (decomposition with foaming) |
| 13 | 6-Nitro-4-oxo-4H-1-benzopyran-3-carboxaldehyde + Malonic acid | Trans 3-(6-nitro-4-oxo-4H-1-benzopyran-3)-acrylic acid | Colorless needles / Acetone | 274-278 (decomposition with foaming) |
| 14 | 6-Methyl-4-oxo-4H-1-benzopyran-3-carboxaldehyde + Malonic acid | Trans 3-(6-methyl-4-oxo-4H-1-benzopyran-3)acrylic acid | Pale yellow needles / Dimethylformamide, water | 256 (decomposition with foaming) |

—Continued

| Example No. | Starting compounds | Product | Crystal form / Solvent for recrystallization | Melting point (°C) |
|---|---|---|---|---|
| 15 | 6-n-Butyl-4-oxo-4H-1-benzopyran-3-carboxaldehyde + Malonic acid | Trans 3-(6-n-butyl-4-oxo-4H-1-benzopyran-3)acrylic acid | White needles / Methanol | 211-212 |
| 16 | 6-Chloro-4-oxo-4H-1-benzopyran-3-carboxaldehyde + Malonic acid | Trans 3-(6-chloro-4-oxo-4H-1-benzopyran-3)acrylic acid | White needles / Dimethylformamide; water | 281-282 (decomposition with foaming) |

\* Purified by silica gel chromatography

Solvent ; chloroform : acetone : formic acid (4:1:0.3)

\*\*Infrared absorption spectrum (KBr)(cm$^{-1}$): 3400,3175(OH), 1710(COOH), 1630,1620,1600

Mass spectrum: m/e 248(M$^{+}$)

EXAMPLE 17

A solution of 1,040 parts of 4-oxo-4H-1-benzopyran-3-carboxaldehyde and 872 parts of monoethyl malonate in 10 parts by volume of pyridine is heated in an oil bath at 110°C for 30 minutes. The solvent is removed to obtain the residue. Recrystallization from ethanol yields 210 parts of trans ethyl 3-(4-oxo-4H-1-benzopyran-3)acrylate as colorless long needles melting at 110° to 111°C. Elemental analysis Calculated for C$_{14}$H$_{12}$O$_4$: C, 68.84; H, 4.95
Found: C, 68.82; H, 4.87

Infrared absorption spectrum (KBr) (cm$^{-1}$) 1705,1670,1630,1615,1570

A mixture of 244 parts of trans ethyl 3-(4-oxo-4H-1-benzopyran-3)acrylate, 2 parts by volume of acetic acid and 2 parts by volume of 6N-sulfuric acid is refluxed for 3 hours. Then, the reaction mixture is poured into ice-water and the resulting precipitates are collected by filtration and recrystallized from acetone. The procedure yields 110 parts of trans 3-(4-oxo-4H-1-benzopyran-3) acrylic acid as pale yellowish needles melting at 245°-246°C(decomposition with foaming).

EXAMPLE 18

A mixture of 1,740 parts of 4-oxo-4H-1-benzopyran-3-carboxaldehyde and 1,550 parts of malonmonoamide in 10 parts by volume of pyridine is heated in an oil bath, temperature of which is at 110°C, for 1 hour. The reaction mixture is concentrated. The resulting residue is washed with water and collected by filtration. Recrystallization from 130 parts by volume of acetone gives 790 parts of trans 3-(4-oxo-4H-1-benzopyran-3)acrylamide as pale yellow prisms melting at 244° to 245°C. Elemental analysis Calculated for C$_{12}$H$_9$NO$_3$: C, 66.97; H, 4.21; N, 6.51
Found: C, 66.30; H, 4.27; N; 6.40

A mixture of 690 parts of trans 3-(4-oxo-4H-1-benzopyran-3)acrylamide, 6 parts by volume of acetic acid and 6 parts by volume of 6N-sulfuric acid is refluxed for 36 hours. The reaction mixture is poured into ice-water and the resulting precipitates are collected by filtration and washed with water. Recrystallization from acetone gives 320 parts of trans 3-(4-oxo-4H-1-benzopyran-3)acrylic acid as pale yellowish needles melting at 245°-246°C(decomposition with foaming).

EXAMPLE 19

To a mixture of 10,440 parts of 4-oxo-4H-1-benzopyran-3-carboxaldehyde and 5,400 parts of cyanoacetic acid is added 25 parts by volume of pyridine, dropwise, in an oil bath, at a temperature of 110°C, for 30 seconds and then the mixture is heated at 110°C for 8 minutes, after which time the reaction mixture is cooled. The precipitated crystals are collected by filtration and recrystallized three times from ethanol. The procedure yields 6,600 parts of trans 3-(4-oxo-4H-1-benzopyran-3)acrylonitrile as pale yellowish prisms melting at 192°–194°C. Elemental analysis Calculated for $C_{12}H_7NO_2$: C, 73.09; H, 3.58; N, 7.10
Found: C, 73.48; H, 3.60; N, 7.01

Infrared absorption spectrum (KBr)(cm$^{-1}$) 2200(-CN), 1655,1620,1565

Nuclear Magnetic Resonance spectrum($d_6$-dimethylsulfoxide) d: 8.77(1H,singlet,$H_2'$), 7.31(1H,doublet,$J_{2,3}$=16Hz.,$H_3$), 6.94(1H,doublet,$J_{2,3}$=16Hz,$H_2$), etc.

A mixture of 394 parts of trans 3-(4-oxo-4H-1-benzopyran-3)acrylonitrile, 5 parts by volume of acetic acid and 5 parts by volume of 6N-sulfuric acid is refluxed for 36 hours. The reaction mixture is poured into ice-water and the resulting precipitates are collected by filtration. Recrystallization from acetone gives 150 parts of trans 3-(4-oxo-4H-1-benzopyran-3)acrylic acid as pale yellow needles melting at 245°–246°C(decomposition with foaming).

EXAMPLE 20

A solution of 204 parts of 7-methoxy-4-oxo-4H-1-benzopyran-3-carboxaldehyde and 130 parts of monomethyl malonate in 2 parts by volume of pyridine is heated in an oil bath at 110°C for 30 minutes. The solvent is removed to obtain the residue. Recrystallization from acetone yields 90 parts of trans methyl 3-(7-methoxy-4-oxo-4H-1-benzopyran-3)acrylate as colorless needles melting at 164°–168°C. Infrared absorption spectrum (KBr)(cm$^{-1}$)

1713,1660,1624,1600,1270,1240

Nuclear Magnetic Resonance spectrum($d_6$-dimethylsulfoxide)

7.53(doublet,1H,J=166Hz.),7.13(doublet,1H,J=16Hz.),
3.93(singlet,3H),3.77(singlet,3H).

A mixture of 1.5 part by volume of glacial acetic acid, 1.5 parts by volume of concentrated hydrobromic acid and 260 parts of trans methyl 3-(7-methoxy-4-oxo-4H-1-benzopyran-3)-acrylate is refluxed for about 2 hours. Then, the reaction mixture is poured into ice-water and the resulting solids are collected by filtration and recrystallized from dimethylformamide-water. The procedure yields 110 parts of trans 3-(7-hydroxy-4-oxo-4H-1-benzopyran-3)acrylic acid as a light-yellowish solid melting at 288°–290°C(decomposition with foaming).

By a procedure similar to that described above, yellow needles of trans 3-(6,7-dihydroxy-4-oxo-4H-1-benzopyran-3)-acrylic acid, melting at 300°C or higher is obtained from trans 3-(6,7-diacetoxy-4-oxo-4H-1-benzopyran-3)acrylic acid.

EXAMPLE 21

A mixture of 870 parts of 4-oxo-4H-1-benzopyran-3-carboxaldehyde, 2 parts by volume of diethyl malonate and 4 parts by volume of acetic anhydride is refluxed for 1 hour. The solution is concentrated to dryness and the residual syrup is crystallized by cooling. The crystals are collected by filtration, washed with ethanol and recrystallized from ethanol, whereby 810 parts of ethyl 2-ethoxycarbonyl-3-(4-oxo-4H-1-benzopyran-3)acrylate is obtained as colorless plates melting at 108.5°–109.5°C. Infrared absorption spectrum (KBr)(cm$^{-1}$)

1725,1655,1635,1620,1275,1250,1220,760.

Nuclear Magnetic Resonance spectrum (CDCl$_3$) d:
8.33(1H,doublet,J=1Hz,chromone-$H_2$),ca8.20(1H,doublet of doublet,J=7 and 2Hz.,chromone-$H_5$), 7.76(1H,doublet, J=1Hz.,$H_3$),7.3-7.7(3H,multiplet,chromone-$H_6$-$H_8$) about 4.4 (4H,OCH$_2$), about 1.4(6H, -CH$_3$)

A mixture of 316 parts of ethyl 2-ethoxycarbonyl-3-(4-oxo-4H-1-benzopyran-3)acrylate, 2 parts by volume of acetic acid and 2 parts by volume of 6N-sulfuric acid is refluxed for 3 hours. Then, the reaction mixture is poured into ice-water and the resulting precipitates are collected by filtration and recrystallized from acetone. The procedure yields 40 parts of trans 3-(4-oxo-4H-1-benzopyran-3)acrylic acid.

EXAMPLE 22

In 10 parts by volume of water is suspended 216 parts of trans 3-(4-oxo-4H-1-benzopyran-3)acrylic acid. Then, the suspension is adjusted to a pH of 6–7 by using an equimolar amount of an aqueous solution of sodium hydroxide with respect to the starting material to dissolve the starting material in water. The solution is concentrated to dryness and ethanol is added to the concentrate. The resulting precipitates are collected by filtration and washed with diethyl ether. The procedure yields sodium trans 3-(4-oxo-4H-1-benzopyran-3)acrylate as a pale yellowish powder which is readily soluble in water.

Infrared absorption spectrum (cm$^{-1}$):
1645,1620,1560,980

EXAMPLE 23

In 5 parts by volume of ethanol, 244 parts of trans 3-(6-ethyl-4-oxo-4H-1-benzopyran-3)acrylic acid is suspended. Then, the suspension is adjusted to a pH of 7 by using one part by volume of 1N-aqueous solution of sodium hydroxide to dissolve the starting material. The solution is concentrated to dryness and the residue is dissolved in 10 parts by volume of methanol. The solution is decolorized with activated carbon and concentrated to dryness. Then, the pink residue is washed with 10 parts by volume of diethyl ether and dried. The procedure yields sodium trans 3-(6-ethyl-4-oxo-4H-1-benzopyran-3)acrylate as a pink powder which is readily soluble in water.

Infrared spectrum (cm$^{-1}$) : 1650,1618,1560,980

EXAMPLE 24

To 5 parts by volume of ethanol is added 145 parts of trans 3-(4-oxo-4H-1-benzopyran-3)acrylic acid, followed by the addition of 120 parts of DL-methylephedrine. The mixture is warmed to dissolve the starting material. The solution is concentrated to dryness and the residue is washed with 5 parts by volume of ether. The precipitates are collected by filtration and recrystallized from 1.2 part by volume of ethanol. The procedure yields 165 parts of the DL-methylephedrine salt of trans 3-(4-oxo-4H-1-benzopyran-3)acrylic acid as colorless pillars melting at 149°C.
Elemental analysis Calculated for $C_{23}H_{25}O_5N$: C, 69.85; H, 6.37; N, 3.54
Found: C, 69.67; H, 6.22; N, 3.29

By a procedure similar to that described above, the ethanolamine salt of trans 3-(4-oxo-4H-1-benzopyran-3)acrylic acid (melting point 147°C, as colorless needles when recrystallized from ethanol) is obtained.

EXAMPLE 25

A mixture of 174 parts of 4-oxo-4H-1-benzopyran-3-carboxaldehyde, 125 parts of malonic acid and 200 parts of 2-methylimidazole is heated in an oil bath at 120°C for 5 minutes. After cooling, water is added to the reaction mixture and the solution is extracted with 10 parts by volume of ethyl acetate. The water layer is made acid with concentrated hydrochloric acid and the solid separated out is collected by filtration. The solid is crystallized from acetone. The procedure yields 50 parts of trans 3-(4-oxo-4H-1-benzopyran-3)acrylic acid as pale yellowish needles melting at 245°–246°C (decomposition with foaming).

EXAMPLE 26

The following compounds are synthesized by procedure similar to that described in Example 1:
Trans 3-(6-cyclohexyl-4-oxo-4H-1-benzopyran-3)acrylic acid.
Trans 3-(7-butoxy-5-hydroxy-4-oxo-4H-1-benzopyran-3)acrylic acid.
Trans 3-(8-dipropylamino-4-oxo-4H-1-benzopyran-3)acrylic acid.
Trans 3-(6-benzoyloxy-4-oxo-4H-1-benzopyran-3)acrylic acid.
Trans 3-(6-hexyl-4-oxo-4H-1-benzopyran-3)acrylic acid.
Trans 3-(6-amino-4-oxo-4H-1-benzopyran-3)acrylic acid.
Trans 3-(6-formyl-4-oxo-4H-1-benzopyran-3)acrylic acid.
Trans 3-(6-fluoro-4-oxo-4H-1-benzopyran-3)acrylic acid.

EXAMPLE 27

Some examples of compositions in which the compounds of this invention are utilized in the treatment of allergic disease are as follows:

A. (Tablet)
| | |
|---|---|
| (1) trans 3-(6-ethyl-4-oxo-4H-1-benzopyran-3)-acrylic acid | 20 mg. |
| (2) lactose | 35 mg. |
| (3) corn starch | 150 mg. |
| (4) microcrystalline cellulose | 30 mg. |
| (5) magnesium stearate | 5 mg. |
| | 240 mg. per tablet |

(1), (2), (3), two-thirds of the amount of (4) and half of (5) are throughly mixed, and then the mixture is granulated. The remaining one-third quantity of (4) and half of the amount of (5) are added to the granules and compressed into tablets. The tablets thus prepared can further be coated with a suitable coating agent, e.g. sugar.

B. (Capsule)
| | |
|---|---|
| (1) trans 3-(6-ethyl-4-oxo-4H-1-benzopyran-3)-acrylic acid | 20 mg. |
| (2) lactose | 102 mg. |
| (3) microcrystalline cellulose | 70 mg. |
| (4) magnesium stearate | 8 mg. |
| | 200 mg. per capsule |

(1), (2), (3) and half of the amount of (4) are throughly mixed, and then the mixture is granulated. The remaining half of (4) is added to the granules and the whole is filled into a gelatin capsule.

C. (Injection)
| | |
|---|---|
| (1) sodium 3-(6-ethyl-4-oxo-4H-1-benzopyran-3)-acrylate | 10 mg. |
| (2) inositol | 100 mg. |
| (3) benzyl alcohol | 20 mg. |

All ingredients are dissolved in water to make 2.0 ml. of a solution (pH 7.5) serving as an injectable.

What is claimed is:
1. A compound of the formula:

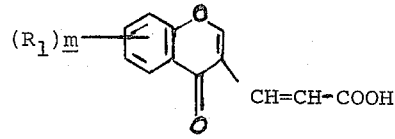

wherein $m$ is 0, 1 or 2 and each of $R_1$ is a member selected from the group consisting of halogen, hydroxy, nitro, amino, lower alkylamino, lower alkyl, lower alkoxy, alkanoyloxy and benzoyloxy and the pharmaceutically acceptable salts thereof.

2. A compound as claimed in claim 1, wherein the pharmaceutically acceptable salt is a member selected from the group consisting of an alkali metal salt, ammonium salt and an organic amine compound selected from the group consisting of mono, di- or triethanolamine, diethylamine, triethylamine, dimethylephedrine, 1-β,5-dihydroxy phenol)-L-isopropyl-aminoethanol, isoproterenol (3,4-dihydroxy-a-[(isopropylamino) methyl] benzyl alcohol), hetrazan (diethyl carbamazine), and dextromethorphan (d-3-methoxy-N-methylmorphinan).

3. A compound as claimed in claim 2, wherein the pharmaceutically acceptable salt is DL-methylephedrine salt.

4. A compound as claimed in claim 1, wherein $R_1$ is a lower alkyl group having up to six carbon atoms.

5. A compound as claimed in claim 1, wherein $R_1$ is a lower alkoxy group having up to four carbon atoms.

6. A compound as claimed in claim 1, wherein $R_1$ is a lower alkanoyloxy group having up to seven carbon atoms.

7. A compound as claimed in claim 1, wherein $R_1$ is a lower alkylamino selected from the group consisting of mono-lower alkylamino and di-lower alkylamino, said lower alkyl group having up to four carbon atoms.

8. A compound as claimed in claim 1, wherein $R_1$ is a halogen atom selected from the group consisting of chlorine, bromine, iodine and fluorine.

9. A compound as claimed in claim 1, wherein $R_1$ is nitro.

10. A compound as claimed in claim 1, which is 3-(4-oxo-4H-1-benzopyran-3)acrylic acid.

11. A compound as claimed in claim 1, which is 3-(6,7-diacetoxy-4-oxo-4H-1-benzopyran-3)acrylic acid.

12. A compound as claimed in claim 1, which is 3-(5-hydroxy-4-oxo-4H-1-benzopyran-3)acrylic acid.

13. A compound as claimed in claim 1, which is 3-(7-hydroxy-4-oxo-4H-1-benzopyran-3)acrylic acid.

14. A compound as claimed in claim 1, which is 3-(7-methoxy-4-oxo-4H-1-benzopyran-3)acrylic acid.

15. A compound as claimed in claim 1, which is 3-(6-methyl-4-oxo-4H-1-benzopyran-3)acrylic acid.

16. A compound as claimed in claim 1, which is 3-(6-ethyl-4-oxo-4H-1-benzopyran-3)acrylic acid.

17. A compound as claimed in claim 1, which is 3-(6-methoxy-4-oxo-4H-1-benzopyran-3)acrylic acid.

18. A compound as claimed in claim 1, which is 3-(6-nitro-4-oxo-4H-1-benzopyran-3)acrylic acid.

19. A compound as claimed in claim 1, which is 3-(6-n-butyl-4-oxo-4H-1-benzopyran-3)acrylic acid.

20. A method for producing a compound of the formula:

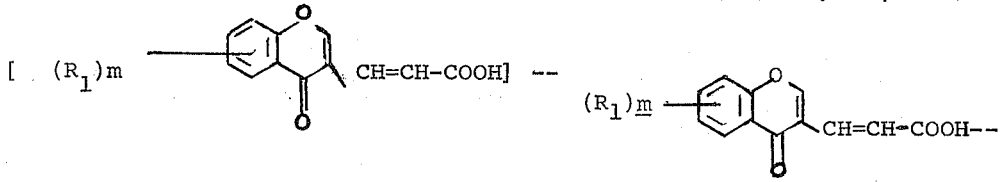

wherein $m$ is 0, 1, or 2 and $R_1$ is a member selected from the group consisting of halogen, hydroxy, nitro, amino, lower alkylamino, lower alkyl, lower alkoxy and lower alkanoyloxy and benzyloxy which comprises reacting a compound of the formula:

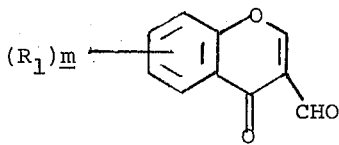

wherein $m$ and $R_1$ are as defined above with a compound of the formula

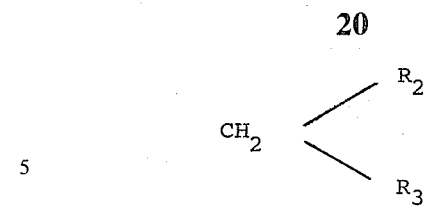

wherein $R_2$ and $R_3$ which may be the same or different are each selected from the group consisting of cyano, carboxyl, and esterified carboxyl and carboxyamide and when $R_2$ and $R_3$ are said esterified carboxyl or carboxyamide, the resulting product is hydrolyzed.

21. A method as claimed in claim 20 wherein the pharmaceutically acceptable salt is an alkali metal salt, ammonium salt or an organic amine salt selected from the group consisting of mono, di- or triethanolamine, diethylamine, triethylamine, di-methylephedrine, 1-(3,5-dihydroxy phenol)-L-isopropyl-aminoethanol, isoproterenol (3,4-dihydroxy-α-benzyl alcohol), hetrazan (diethylcarbamazine), and dextromethorphan (d-3-methoxy-N-methylmorphinan).

22. A method as claimed in claim 20, wherein $R_1$ is a lower alkyl group having up to six carbon atoms.

23. A method as claimed in claim 20, wherein $R_1$ is a lower alkoxy group having up to four carbon atoms.

24. A method as claimed in claim 20, wherein $R_1$ is a lower alkanoyloxy group having up to seven carbon atoms.

25. A method as claimed in claim 20, wherein $R_1$ is a lower alkylamino selected from the group consisting of mono-lower alkylamino and di-lower alkylamino, said lower alkyl group being that having up to four carbon atoms.

26. A method as claimed in claim 20, wherein $R_1$ is a halogen atom selected from the group consisting of chlorine, bromine, iodine and fluorine.

27. A method as claimed in claim 20, wherein $R_1$ is nitro.

28. A method as claimed in claim 20, wherein the reaction is conducted in the presence of a basic reagent or an acid anhydride.

* * * * *

UNITED STATES PATENT OFFICE
CERTIFICATE OF CORRECTION

Patent No. 3,872,108      Dated March 18, 1975

Inventor(s) Nohara, et al

It is certified that error appears in the above-identified patent and that said Letters Patent are hereby corrected as shown below:

Page 1, Under "United States Patent": Change "Ukyo et al" to --Nohara et al--.

Page 1, After "Inventors:" Delete all the information and substitute therefor the following: --Akira Nohara, Kyoto; Tomonobu Umetani, Osaka; Yoshibumi Miyata, Osaka; Yasushi Sanno, Osaka; all of Japan --.

Column 8, line 42: After "thylsulfoxide)" change "d" to -- $\delta$ --.

Column 15, line 21: After "sulfoxide)" change "d" to -- $\delta$ --.

line 46: After "sulfoxide)" add -- $\delta$: --.

line 47: Change "1.66Hz." to --16Hz.--.

Column 16, line 12: Change "d" to -- $\delta$ --.

Column 19, in the first formula of claim 20: Delete the brackets("[" & "]").

Column 20, Delete claim 21 in its entirety, and renumber the remaining claims 22-28 to read 21-27 respectively.

Signed and Sealed this sixteenth Day of March 1976

[SEAL]

Attest:

RUTH C. MASON
*Attesting Officer*

C. MARSHALL DANN
*Commissioner of Patents and Trademarks*